United States Patent
Couzens et al.

(10) Patent No.: US 12,453,547 B2
(45) Date of Patent: Oct. 28, 2025

(54) SURGICAL IMPLANT ASSEMBLY

(71) Applicant: Field Orthopaedics PTY Ltd, Queensland (AU)

(72) Inventors: Greg Couzens, Queensland (AU); Kau Shean Liang, Queensland (AU); Michael Maurer, Queensland (AU)

(73) Assignee: Field Orthopaedics PTY Ltd, Queensland (AU)

( * ) Notice: Subject to any disclaimer, the term of this patent is extended or adjusted under 35 U.S.C. 154(b) by 0 days.

(21) Appl. No.: 19/083,583

(22) Filed: Mar. 19, 2025

(65) Prior Publication Data
US 2025/0213243 A1    Jul. 3, 2025

Related U.S. Application Data

(63) Continuation of application No. PCT/AU2024/050418, filed on Apr. 30, 2024.

(30) Foreign Application Priority Data

May 5, 2023   (AU) ................................ 2023901361

(51) Int. Cl.
*A61B 17/04*   (2006.01)

(52) U.S. Cl.
CPC .. *A61B 17/0401* (2013.01); *A61B 2017/0414* (2013.01); *A61B 2017/0459* (2013.01)

(58) Field of Classification Search
CPC ........ A61B 17/0401; A61B 2017/0403; A61B 2017/0404; A61B 2017/0406;
(Continued)

(56) References Cited

U.S. PATENT DOCUMENTS

| | | | | |
|---|---|---|---|---|
| 1,715,433 | A * | 6/1929 | Stone | H01Q 21/00 343/846 |
| 12,268,381 | B2 * | 4/2025 | Zenz-Olson | A61B 17/0401 |

(Continued)

FOREIGN PATENT DOCUMENTS

| WO | WO 2012/167138 | 12/2012 |
| WO | WO 2020/118087 | 6/2020 |
| WO | WO 2024/229510 | 11/2024 |

OTHER PUBLICATIONS

International Search Report and the Written Opinion Dated Jul. 31, 2024 From the International Searching Authority Re. Application No. PCT/AU2024/050418. (11 Pages).

*Primary Examiner* — Dianne Dornbusch (57) ABSTRACT

A surgical implant assembly comprising: first and second anchor bodies adapted to engage respective metacarpal bone surfaces of first and second metacarpal bones, a primary suture having a suture length extending between first and second terminal segments of the primary suture, the suture length of the primary suture comprising a first suture segment that passes through the first anchor body and a second suture segment passing through the second anchor body with a bridging segment of the primary suture extending between the first and second suture segments of the primary suture wherein the first suture segment lies in between the bridging segment and the first terminal segment and wherein the second suture segment lies in between the bridging segment and the second terminal segment; a secondary suture having a suture length extending between first and second terminal segments of the secondary suture, the secondary suture comprising a secondary suture segment being passed through the first anchor body, the secondary suture segment being located between the first and second terminal segments of the secondary suture and wherein no portion of the secondary suture passes through the second anchor body.

19 Claims, 6 Drawing Sheets

(58) Field of Classification Search
CPC .... A61B 2017/0408; A61B 2017/0412; A61B 2017/0414; A61B 2017/0417; A61B 2017/0419; A61B 2017/042; A61B 2017/0445; A61B 2017/0459; A61B 2017/0496; A61F 2/0811; A61F 2002/0817

See application file for complete search history.

(56) References Cited

U.S. PATENT DOCUMENTS

| | | | |
|---|---|---|---|
| 2003/0236555 A1* | 12/2003 | Thornes | A61B 17/842 606/232 |
| 2007/0185532 A1* | 8/2007 | Stone | A61B 17/0482 606/232 |
| 2008/0140093 A1* | 6/2008 | Stone | A61B 17/0469 606/228 |
| 2008/0177302 A1* | 7/2008 | Shurnas | A61B 17/0401 606/228 |
| 2010/0125297 A1* | 5/2010 | Guederian | A61B 17/0401 606/232 |
| 2012/0046693 A1* | 2/2012 | Denham | A61B 17/06166 606/232 |
| 2019/0090866 A1* | 3/2019 | Paterson | A61F 2/0811 |
| 2020/0093514 A1* | 3/2020 | Perez | A61B 17/683 |
| 2021/0093316 A1* | 4/2021 | Gustafson | A61F 2/0811 |
| 2021/0378654 A1* | 12/2021 | Lombardo | A61B 17/06066 |
| 2022/0323200 A1* | 10/2022 | Connor | A61B 17/1604 |

\* cited by examiner

SURGICAL IMPLANT ASSEMBLY

RELATED APPLICATIONS

This application is a Continuation (CON) of PCT Patent Application No. PCT/AU2024/050418 having International filing date of Apr. 30, 2024, which claims the benefit of priority of Australia Patent Application No. 2023901361 filed on May 5, 2023. The contents of the above applications are all incorporated by reference as if fully set forth herein in their entirety.

FIELD AND BACKGROUND OF THE INVENTION

The present invention relates an implantable sling and anchor assembly in combination with suture that is particularly well suited for the surgical repair and reconstruction of joints, preferably of the hands, in particular the basal joint.

Any references to methods, apparatus or documents of the prior art are not to be taken as constituting any evidence or admission that they formed, or form part of the common general knowledge.

Degenerative osteoarthritis of the first carpal-metacarpal joint (basal joint) of the thumb is a common, disabling condition. This condition occurs when the cartilage in the carpometacarpal (CMC) joint wears away. As arthritis progresses, patients suffer from load-related pain, affecting pinching and gripping activities, and experience weakness, severe dysfunction, reduced mobility, and loss of functionality. Trapeziectomy is a common form of surgery which involves a complete removal of the trapezium bone. Some surgeons fill the gap left by the removed bone using a piece of tendon from your wrist. To fill the space left, you may be given an artificial metal and plastic joint, or a silicone rubber spacer. This method involves essentially removing the arthritic articulation by excising the trapezium and temporarily pinning the joint in distraction. This procedure can provide pain relief, but is associated with persistent collapse deformity, proximal migration, and weakness. The key principles of successful basal joint arthroplasty involve trapezial excision, which is required for pain relief, and some form of ligament reconstruction, which restores the function of the important volar stabilizing ligament, thereby re-creating the proper balance, alignment, longitudinal length, and function of the thumb. With ligament reconstruction, not only is pain relief attained but strength, alignment and stability are achieved. While trapeziectomy is one of the leading methods of addressing such arthritis, it is desirable to provide a method and implantable assembly which can simplify the actual surgical procedure and preferably reduce recovery and rehabilitation times after surgery. Long term results with existing trapeziectomy methods have been excellent with regard to pain relief, but the healing process is lengthy, incisions are extensive and multiple, subsidence with loss of arthroplasty space has been reported, pin tract complications do occur, and the technique is technically demanding, lengthy and invariably requires sacrificing a normal, functioning wrist flexor tendon. The present invention aims to address some of these issues without compromising on the excellent results in relation to pain relief.

SUMMARY OF THE INVENTION

In an aspect, the invention provides a surgical implant assembly comprising:

first and second anchor bodies adapted to engage respective metacarpal bone surfaces of first and second metacarpal bones;

a primary suture having a suture length extending between first and second terminal segments of the primary suture, the suture length of the primary suture comprising a first suture segment that passes through the first anchor body and a second suture segment passing through the second anchor body with a bridging segment of the primary suture extending between the first and second suture segments of the primary suture wherein the first suture segment lies in between the bridging segment and the first terminal segment and wherein the second suture segment lies in between the bridging segment and the second terminal segment;

a secondary suture having a suture length extending between first and second terminal segments of the secondary suture, the secondary suture comprising a secondary suture segment being passed through the first anchor body, the secondary suture segment being located between the first and second terminal segments of the secondary suture and wherein no portion of the secondary suture passes through the second anchor body;

wherein the primary suture is received and passed towards the first anchor body for the first suture segment to be passed through the first anchor body before returning the primary suture thereby forming a first primary loop to engage the first anchor body;

wherein the secondary suture is received and passed towards the first anchor body to pass the secondary suture segment through the first anchor body before returning the secondary suture thereby forming a secondary loop to engage the first anchor body; and wherein, during use, at least sections of the primary and secondary loops overlap along the bridging segment of the primary suture.

In an embodiment, the first and second anchor bodies are sufficiently deformable to be passed through respective bone tunnels drilled in the first and second metacarpal bones.

In an embodiment, the first suture segment that passes through a plurality of apertures in the first anchor body and the second suture segment passing through a plurality of apertures in the second anchor body.

In an embodiment, the surgical implant assembly further comprises a primary suture sleeve for receiving and passing the primary suture towards the first anchor body for the first suture segment to be passed through the first anchor body before returning the primary suture through the primary suture sleeve thereby forming a first primary loop to engage the first anchor body.

In an embodiment, the primary suture sleeve is elongate and extends between first and second ends of the primary suture sleeve such that the primary suture is received into the first end of the primary suture sleeve before passed out from the second end of the primary suture sleeve to pass the primary suture segment through the first anchor body followed by returning the primary suture into the second end of the primary suture sleeve and passed out of the first end of the primary suture sleeve.

In an embodiment, at least a part of the bridging segment passes through and extends out from the primary suture sleeve before extending towards the second anchor body.

In an alternative or additional embodiment, a portion of the primary suture that lies between the first suture segment and the first terminal segment may be optionally passed through the secondary anchor body.

In an embodiment, the surgical implant assembly further comprises a secondary suture sleeve for receiving and passing the secondary suture towards the first anchor body to pass the secondary suture segment through the first anchor body before returning the secondary suture through the secondary suture sleeve thereby forming a secondary loop to engage the first anchor body.

In an embodiment, the secondary suture sleeve is elongate and extends between first and second ends of the secondary suture sleeve such that the secondary suture is received into the first end of the secondary suture sleeve before being passed out from the second end of the secondary suture sleeve to pass the secondary suture segment through the first anchor body followed by returning the secondary suture into the second end secondary suture sleeve and out of the first end of the secondary suture sleeve such that both terminal segments of the secondary suture extend out from the second end of the secondary suture sleeve.

Preferably, the primary and secondary sleeve portions are joined at one or more joining locations. More preferably, the primary and secondary sleeve portions may be provided as part of a unitary sleeve body whereby the primary and secondary sleeve portions are movable relative to each other with respect to said one or more joining locations while still providing two discrete passages in the primary and secondary sleeve portions. The first and second sleeve portions are movable to form a flexible V-shaped structure which enables the unitary sleeve body to function as a sling.

In an embodiment, the primary and secondary sleeve portions are joined at or adjacent their respective second ends.

In an embodiment, each of the primary and secondary sleeve portions are formed from filamentary material to define a longitudinal lumen for each sleeve portion that extends between open ends.

In an embodiment, the first anchor body comprises an elongate and deformable structure with the primary and secondary sutures being pierced through the elongate and deformable structure along a plurality of piercing locations such that tensioning of the primary and/or secondary sutures increases radial dimensions of the first anchor to result in engagement of the first anchor with bone surfaces of the first metacarpal bone and prevent the anchor from passing through the bone tunnel in the first metacarpal bone.

In an embodiment, the primary and secondary sutures are pierced through the first anchor body at said plurality of piercing locations that are spaced away from the ends of the elongate structure of the first anchor body.

In an embodiment, the second anchor body comprises an elongate and deformable structure with the primary suture being pierced through the elongate and deformable structure at a plurality of piercing locations such that tensioning of the primary suture increases radial dimensions of the second anchor to result in engagement of the second anchor with bone surfaces of the second metacarpal bone and prevent the second anchor from passing through the bone tunnel in the second metacarpal bone.

In an embodiment, the primary suture is pierced through the second anchor body at said plurality of piercing locations that are spaced away from the ends of the elongate structure of the second anchor body.

In an embodiment, each of the first and second anchor bodies comprises a flat and fibrous construct.

In an embodiment, terminal ends of the secondary suture comprises needles for piercing through tissue and allowing the terminal ends to be passed through tissue.

In another aspect, the invention provides an inserter having: a first and second elongate shafts wherein the first and second shafts, each shaft comprising a pair of tines positioned at a distal end of the shaft to define a bone tunnel engaging portion for being pushed into a bone to therein create the respective bone tunnels, wherein the tines are spaced apart to define a slot therebetween that forms an anchor carrying portion that is immediately proximal to said passage forming portion such that the anchor positioned in said anchor carrying portion with be advanced into said bone tunnel after said bone tunnels have been formed.

Preferably, the first and second elongate shafts are mutually transverse and preferably perpendicular to each other.

In an embodiment, the first anchor is loaded onto the anchor carrying portion of the first shaft and the second anchor is loaded onto the anchor carrying portion of the second shaft.

In an embodiment, the inserter further comprises respective first and second inserter housing portions for receiving proximal ends of the first and second elongate shafts respectively.

In an embodiment, the first and second housing portions comprises a plurality of suture receiving channels to wind and store the primary and secondary sutures therein.

In another aspect, the invention provides a method for performing basal joint arthroplasty, the method comprising:
providing an implantable assembly, the implantable assembly comprising:
first and second anchor bodies adapted to engage respective metacarpal bone surfaces of first and second metacarpal bones;
a primary suture having a suture length extending between first and second terminal segments of the primary suture, the suture length of the primary suture comprising a first suture segment that passes the first anchor body and a second suture segment passing through the second anchor body with a bridging segment of the primary suture extending between the first and second suture segments of the primary suture wherein the first suture segment lies in between the bridging segment and the first terminal segment and wherein the second suture segment lies in between the bridging segment and the second terminal segment wherein the primary suture is received and passed towards the first anchor body for the first suture segment to be passed through the first anchor body before returning the primary suture thereby forming a first primary loop to engage the first anchor body;
a secondary suture having a suture length extending between first and second terminal segments of the secondary suture, the secondary suture comprising a secondary suture segment being passed through the first anchor body, the secondary suture segment being located between the first and second terminal segments of the secondary suture and wherein no portion of the secondary suture passes through the second anchor body wherein the secondary suture is received and passed towards the first anchor body to pass the secondary suture segment through the first anchor body before returning the secondary suture thereby forming a secondary loop to engage the first anchor body; and,
performing a trapeziectomy to create an arthroplasty space;
inserting the first anchor body through a first bore drilled across an index metacarpal bone followed by tensioning the primary suture such that at least sections of the primary and secondary loops overlap along the bridging segment of the primary suture whereby the first bore extends between two openings on the outer surface of the index metacarpal bone to effect engagement and anchoring of the first anchor body against the index metacarpal bone surface;

inserting the second anchor body through a second bore drilled across a thumb metacarpal bone followed by tensioning of the secondary suture whereby the second bore extends between two openings on the outer surface of the thumb metacarpal bone to effect engagement and anchoring of the second anchor body against the thumb metacarpal bone surface;

tensioning the primary and secondary sutures to position at least portions of the bridging segment of the primary suture and the secondary suture segment of the secondary suture in the arthroplasty space along the articular base of the thumb metacarpal bone.

In an embodiment, the implant assembly further comprises:

a primary suture sleeve for receiving and passing the primary suture towards the first anchor body for the first suture segment to be passed through the first anchor body before returning the primary suture through the primary suture sleeve thereby forming a first primary loop to engage the first anchor body; and a secondary suture sleeve for receiving and passing the secondary suture towards the first anchor body to pass the secondary suture segment through the first anchor body before returning the secondary suture through the secondary suture sleeve thereby forming a secondary loop to engage the first anchor body wherein tensioning the primary and secondary sutures results in the primary and secondary suture sleeves being positioned below the articular base of the thumb metacarpal bone to form a sling and support the articular base of the thumb metacarpal bone.

In yet another aspect, there is provided a surgical implant assembly comprising:

first and second anchor bodies adapted to engage respective bone surfaces of first and second bone regions;

a primary suture having a suture length extending between first and second terminal segments of the primary suture, the suture length of the primary suture comprising a first suture segment that passes through the first anchor body and a second suture segment passing through the second anchor body with a bridging segment of the primary suture extending between the first and second suture segments of the primary suture wherein the first suture segment lies in between the bridging segment and the first terminal segment and wherein the second suture segment lies in between the bridging segment and the second terminal segment;

a secondary suture having a suture length extending between first and second terminal segments of the secondary suture, the secondary suture comprising a secondary suture segment being passed through the first anchor body, the secondary suture segment being located between the first and second terminal segments of the secondary suture and wherein no portion of the secondary suture passes through the second anchor body;

wherein the primary suture is received and passed towards the first anchor body for the first suture segment to be passed through the first anchor body before returning the primary suture thereby forming a first primary loop to engage the first anchor body;

wherein the secondary suture is received and passed towards the first anchor body to pass the secondary suture segment through the first anchor body before returning the secondary suture thereby forming a secondary loop to engage the first anchor body; and wherein, during use, at least sections of the primary and secondary loops overlap along the bridging segment of the primary suture.

BRIEF DESCRIPTION OF THE SEVERAL VIEWS OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows:

FIGS. 3A to 3D sequentially illustrate insertion and deployment of the implant assembly 1000 in accordance with a method embodiment.

DESCRIPTION OF SPECIFIC EMBODIMENTS OF THE INVENTION

Figure 1:
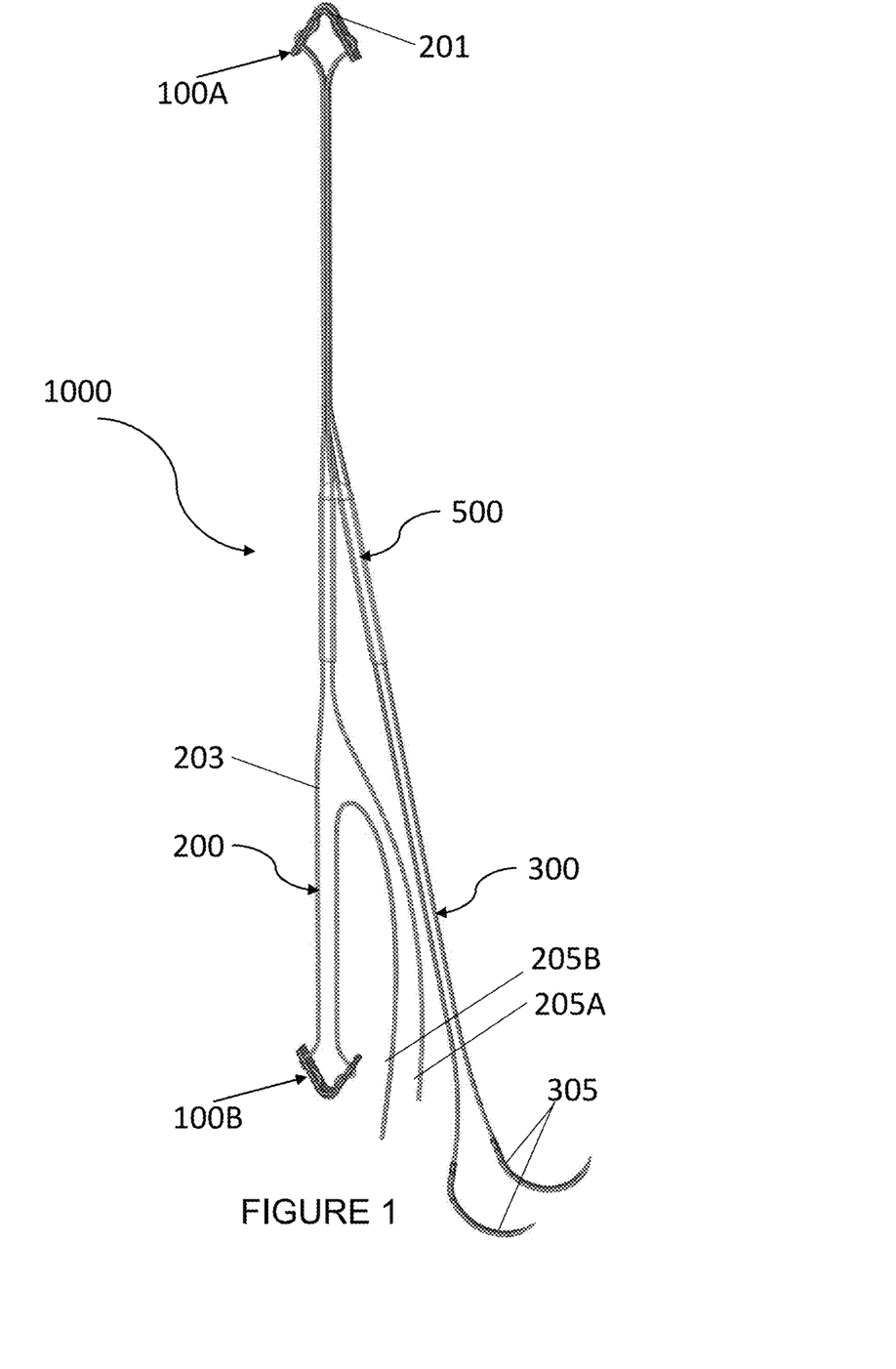
FIG. 1 is a top perspective view of a surgical implant assembly 1000 in accordance with a first embodiment.
Figures 2A, 2B:
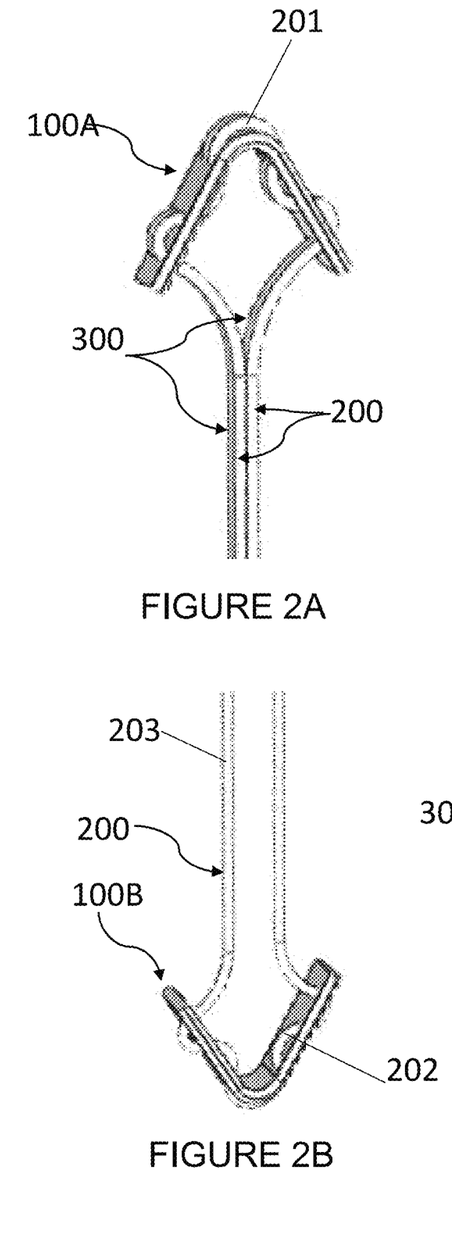
FIG. 2A is an enlarged view of the first anchor body 100A.
FIG. 2B is an enlarged view of the second anchor body 100B.
Figure 2C:
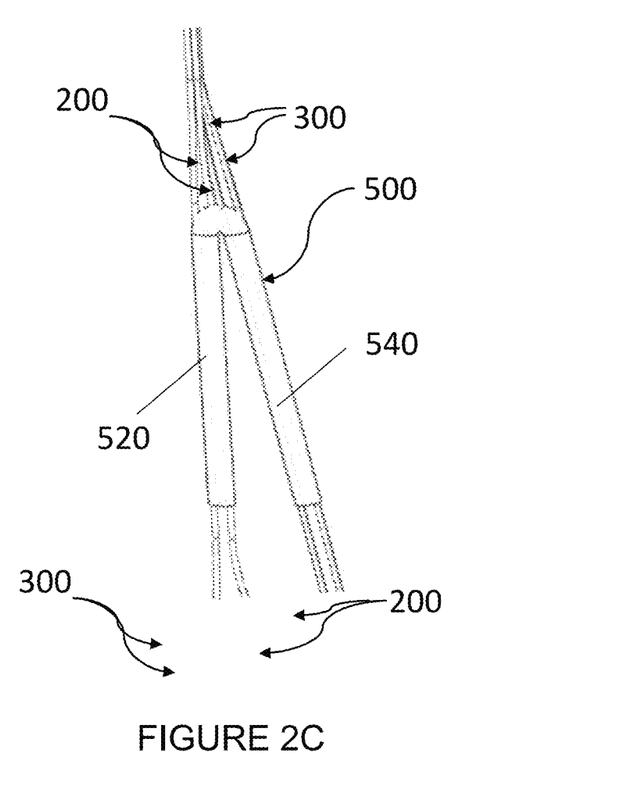
FIG. 2C is an enlarged view of the sleeve member 500 with primary and secondary sleeve portions 520 and 540.

FIGS. 1 to 3 illustrate a surgically implantable sling assembly 1000 which is particularly well suited for carrying out trapeziectomy and suspensionplasty in which the trapezium (one of the carpal bones of the wrist that forms part of the thumb joint) is removed to manage symptoms of thumb arthritis. Thumb arthritis is also known as carpometacarpal joint osteoarthritis. The method steps for carrying out the suspensionplasty have been illustrated stepwise in FIGS. 3A to 3D and will be explained in the foregoing sections after the surgical implant assembly 1000 and its various key components have been described.

FIG. 1 illustrates an assembled view of the surgical implant assembly 1000 which consists of first and second flexible suture anchor bodies 100A and 100B that have a substantially identical configuration. The anchor bodies 100A and 100B are preferably made from flexible and biocompatible material. However, in other embodiments, the anchor bodies 100A and 100B may be made from non-flexible materials including but not limited to biocompatible alloys or hard polymeric buttons. Each of the anchor bodies generally denoted by 100 comprises a deformable and elongate configuration preferably made from fibrous material. The anchor bodies 100 are sufficiently deformable to allow the deformed anchor bodies to be pushed through bone tunnels drilled into metacarpal bones as will be discussed in the foregoing sections. The flat and fibrous construct of the anchor bodies 100 allows the anchor bodies to not only be deformable but also allows one or more sutures to be passed through the fibrous body of the anchor bodies through a plurality of apertures that allow suture to be passed through. These apertures may be formed by piercing the flat fibrous construct of the anchor bodies 100 at multiple locations. The flat and elongate profile of the anchor bodies 100 may be folded along a middle region of the anchor bodies 100 to allow the two ends of the anchor bodies to move closer and define a somewhat U-shaped or V-shaped configuration having an apex portion with anchor limbs extending from the apex portion. Such a configuration allows the apex portion of the anchor bodies 100 to be inserted into a drilled bone tunnel which results in the anchor limbs being moved towards each other into a radially narrow configuration while the anchor bodies 100 are pushed through bone tunnels.

As shown most clearly in FIGS. 2A and 2B, each anchor body 100 and 200 comprises a flat and elongate profile with two limbs of the anchor extending from an apex portion of the anchor bodies. Each anchor body 100 comprises an outer surface 112 and an inner surface 114. One or more sutures are pierced into the inner surface 114 at a first location that is spaced away from one end of the anchor body 100 and passed through the thickness of the anchor body 100 resulting in the suture being effectively woven through the length of the anchor body 100 before extending out of a second spaced location that is spaced away from another end of the anchor body 100. Such a configuration of the anchor body 100 results in the anchor body 100 undergoing a radial expansion of the deformable anchor body 100 when the suture passing through the anchor body 100 is tensioned which results in the anchor bodies 100A or 100B engaging against bone tissue and no longer being sufficiently narrow to pass through the respective bone tunnels. It may be understood that other anchor body configurations that allow a soft and deformable anchor body such as 100 to be passed through a narrow bone tunnel followed by radial expansion when the suture(s) passing through the anchor body 100 is tensioned. As previously discussed, the deformable anchor bodies 100A and 100B are not limiting and non-deformable anchor bodies may also be used to achieve the intended function of the anchor bodies 100 in other alternative embodiments.

The first and second anchor bodies 100A and 100B are interconnected by a primary suture 200. The implant assembly 1000 also comprises a secondary suture 300 that also passes through the first anchor body 100A but does not pass through the second anchor body 100B. The secondary suture 300 comprises a length (the secondary suture length) that extends between terminal ends of the secondary suture 300. The terminal ends for the secondary suture 300 are provided with needles 305 that enable the sutures to be passed through tissue as will be discussed in the foregoing sections.

The primary suture 200 comprises a primary suture length that extends between the terminal segments 205 of the primary suture 200. The primary suture 200 comprises a first primary suture segment 201 that passes from a first end of the first anchor body 100A and out of the second end of the first anchor body 100A in a manner as described in the previous sections to enable first anchor body 100A to undergo radial expansion when the primary suture 200 is tensioned. The primary suture 200 also comprises a second suture segment 202 that passes from a first end of the second anchor body 100B to a second end of the second anchor body 100B once again in a manner as described in the previous sections to enable first anchor body 100A to undergo radial expansion when the primary suture 200 is tensioned. A bridging segment bridging segment 203 extends from the second end of the first anchor body 100A to the first end of the second anchor body 100B thereby resulting in primary suture passing through both the first and second anchor bodies 100A and 100B. The first suture segment 201 lies in between the bridging segment 203 and the first terminal segment 205A and the second suture segment 202 lies in between the bridging segment 203 and the second terminal segment 205B. Optionally, a portion of the primary suture 200 that lies between the first suture segment 201 and the first terminal segment 205A may be optionally passed through the secondary anchor body 100B in an alternative embodiment.

Unlike the primary suture 200, the secondary suture 300 only passes through the first anchor body 100A. In the preferred embodiment, the secondary suture 300 also comprises terminal segments 305 with a secondary suture segment 301 (extending between the terminal segments 305) being passed through the primary anchor body 100A. Specifically, the secondary suture segment 301 follows a similar path as the first suture segment 201 of the primary suture 200 by extending into the first anchor body 100A at its first end and then being passed out of the second end of the first anchor body 100A through multiple apertures in the anchor body 100A to allow to enable first anchor body 100A to undergo radial expansion when the primary secondary suture 300 is tensioned.

As is evident from FIGS. 1 and 2, the implant assembly 100 uses a novel combination of two deformable anchors 100A and 100B in combination with the primary suture 200 (that connects the anchors 100A and 100B) while the secondary suture 300 is connected only to the first anchor body 100B such that tensioning of the secondary suture 300 does not directly affect deformation or deployment of the second anchor body 100B. The working of the implant assembly 1000 will be discussed in detail in the foregoing sections.

Additionally, a primary suture sleeve portion 520 is provided for receiving and passing a first sleeve engaging segment of the primary suture 200 that extends from the first terminal segment 205A towards the first end of first anchor body 100A. The primary suture sleeve portion 520 also receives and passes a second sleeve engaging segment (that is part of the bridging segment 203) of the primary suture 200 that is returned from the second end of the anchor body 100A to extend towards the second anchor body 100B as has been previously described. The first sleeve portion 520 thus assists in forming a first loop of the primary suture 200 that engages the first anchor body 100A. The primary suture sleeve portion 520 is elongate and extends between first and second ends of the primary suture sleeve 520 such that the primary suture 200 is received into the first end of the primary suture sleeve 520 before being passed out from the second end of the primary suture sleeve 520 to pass the primary suture segment 201 into the first end of the anchor body 100A. The primary suture 200 is then returned back from the second end of the first anchor body 100A towards the second end of the primary suture sleeve 520 and then passed through the primary suture sleeve before exiting the primary suture sleeve 520 through its second end to extend towards the first end of the second anchor body 100B. As a result, the first terminal segment 205A extends out from the first end of the primary sleeve portion 520 while the second terminal segment 205B extends from the second end of the second anchor body 100B.

A secondary suture sleeve portion 540 is also provided for receiving and passing a first sleeve engaging segment of the secondary suture 300 that extends from the first terminal end towards the first end of the first anchor body 100A. The secondary sleeve portion 540 also receives a second sleeve engaging segment that is returned from the second end of the second anchor body 100B. As a result, the terminal segments 305 extend out from a first open end of the secondary suture sleeve portion 540.

In the preferred embodiment, the primary and secondary sleeve portions 520 and 540 are joined at a joining location along their second ends as illustrated most clearly in FIG. 2C. The primary and secondary sleeve portions 520 and 540 may be formed from a unitary hollow sleeve body made from a flexible and woven material by forming a large slit along a middle portion to divide the sleeve into the primary and secondary sleeve portions 520 and 540 that are joined at a joining location in the middle portion to allow the primary and secondary sleeve portions 520 and 540 to be movably disposed about the joining location to define a V-shaped configuration which allows their use as a supporting sling.

FIGS. 3A to 3D illustrate the perspective view from the Palmar side (front) of the right hand such that the thumb is to the right, referred to as the radial side or edge, and the index finger and other fingers are to the left, referred to as the ulnar side or edge. The implant assembly 100 which includes the anchor bodies 100 and the sling 500 exhibit rotational symmetry and hence can be implanted in either the right or left hand. All of the Figures show the trapezium bone being removed leaving behind an arthroplasty space S.

Figure 3A:
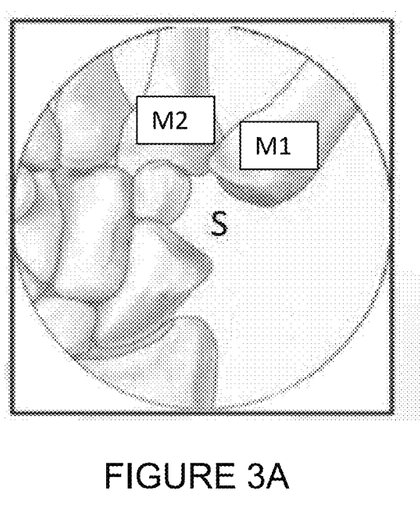
FIGS. 3A to 3D show the perspective view from the Palmar side (front) of the right hand such that the thumb is to the right, referred to as the radial side or edge, and the index finger and other fingers are to the left, referred to as the ulnar side or edge.
Figure 3B:
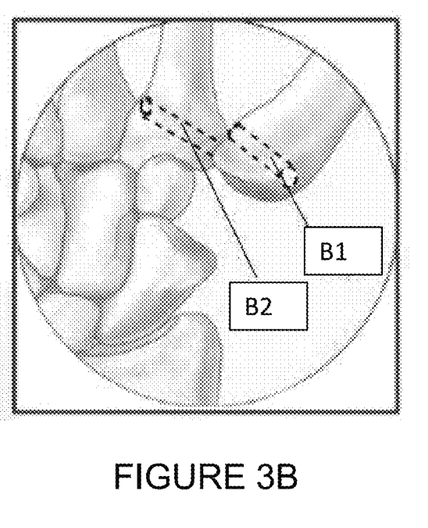
Figure 3C:
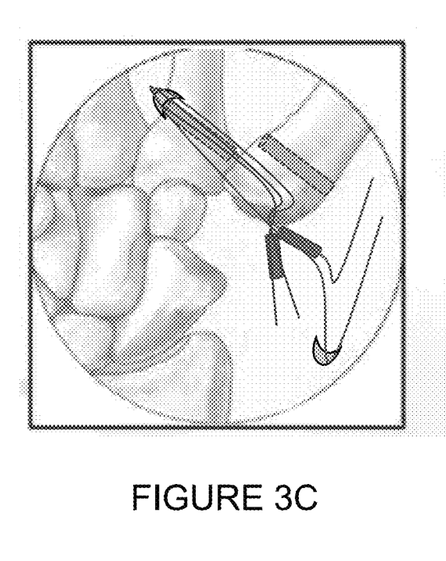
Figure 3D:
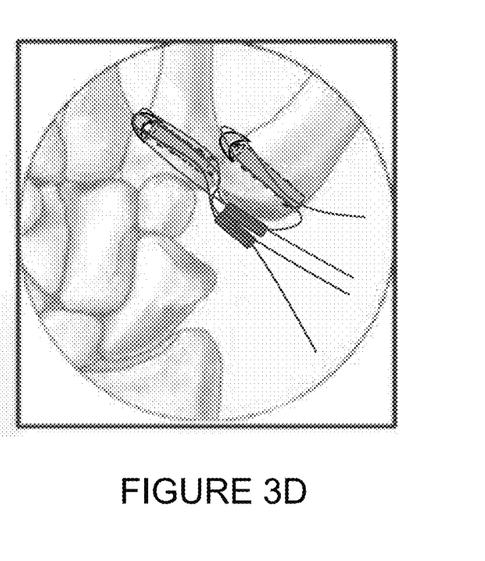

The arthroplasty procedure results in the sling 500 being anchored or tethered in place on the articular base of the thumb metacarpal using suture anchor bodies 100A and 100B, and secondary suture 300. The first anchor body 100A forms the leading anchor that is inserted through a bore B2 drilled into the index metacarpal (M2). A first bore B2 drilled into the index metacarpal extends between two openings located on index metacarpal. The leading suture anchor 100A is inserted through the bore B2 to anchor the leading suture anchor 100A on a metacarpal bone surface of the index metacarpal bone M2 as shown in FIG. 3C. A second bore B1 is drilled through the thumb metacarpal bone M1. The second bore B1 also extends between two openings within the thumb metacarpal bone which allows the second anchor body 100B to form a trailing anchor that is positioned to be anchored against a metacarpal bone surface of the thumb metacarpal bone M1. The anchoring of the suture anchors 100A results in the primary and secondary sutures 200 and 300 extending through the first bore B2 of the index metacarpal bone M2. The insertion of the second anchor body 100B through the second bore B1 of the thumb metacarpal bone M1 results in the second anchor body 100B being anchored against a metacarpal bone surface of the thumb metacarpal bone M1. The anchoring of the second anchor body 100B results in the primary suture 200 also passing through the second bore B1 as shown in FIG. 3D.

The needles located at the terminal segments 305 for the secondary suture 300 are used for piercing the Abductor Pollicis Longus tendon to secure the secondary suture 300 with the tendon. This step is accompanied by tensioning of the secondary suture 300 that results in the radial expansion of the first anchor body 100A thereby resulting in the first anchor body 100A being secured against the bone surface of the index metacarpal M2 while the sleeve 500, particularly sleeve portions 520 and 540 are positioned along articular base of the thumb metacarpal. Specifically, the positioning and securement of the second anchor body 100B against the metacarpal surface of the thumb metacarpal bone M1 results in the sleeve portions 520 and 540 being positioned to function as a sling that supports the articular base of the thumb metacarpal. The terminal segments 205 may be tied with each other to form a knot once the primary suture 200 has also been adequately tensioned to secure the second anchor body 100B. Fully tensioning the primary suture 200 allows the sleeve 500 (with sleeve portions 520 and 540) to function as a basal joint stabilizer that is tethered or anchored by the anchor bodies 100A and 100B. Tensioning of the primary suture 200 by pulling the terminal ends 250 also conforms the shape of the sleeve portions 520 and 540 with the complex shape of the articular base of the thumb metacarpal bone M1.

It would also be understood that the sleeve 500 is optional and in at least some alternative embodiments. As evident from the accompanying Figures, the sleeve portions 520 and 540 surround the primary and secondary sleeve engaging elements of the primary and secondary sutures 200 and 300 respectively. Whilst the provision of the sleeve portions 520 540 provides additional surface area for support, the primary function of supporting or stabilizing the basal joint can be carried out by portions of the primary and secondary sutures 200 and 300 that are positioned along the basal joint as a result of the novel configuration of the aforementioned anchor bodies 100A, 100B and the primary and secondary sutures 200 and 300 in the surgical implant sling assembly 1000.

Figure 4:
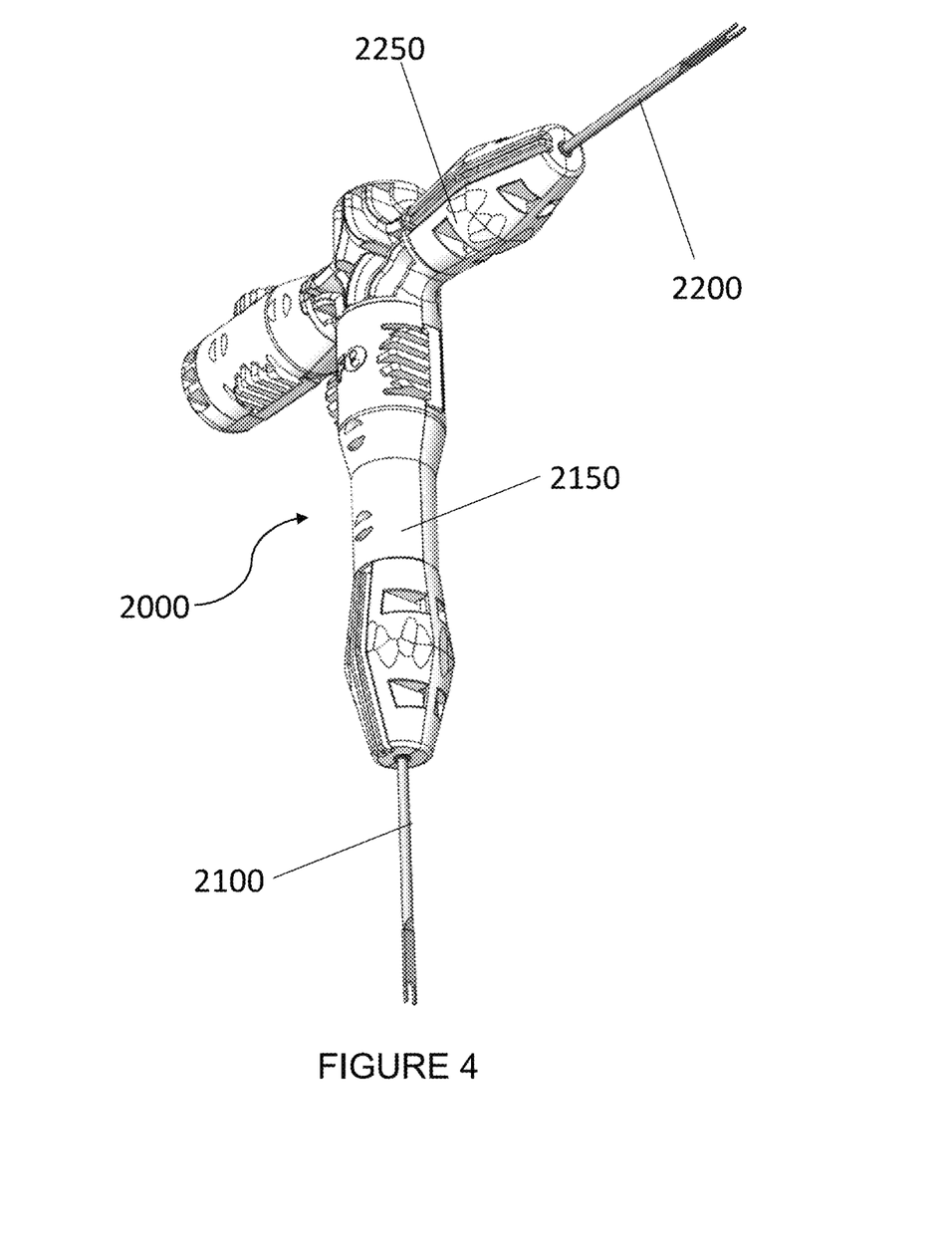
FIG. 4 is a perspective view of an inserter 2000 in accordance with a preferred embodiment.
Figure 5:
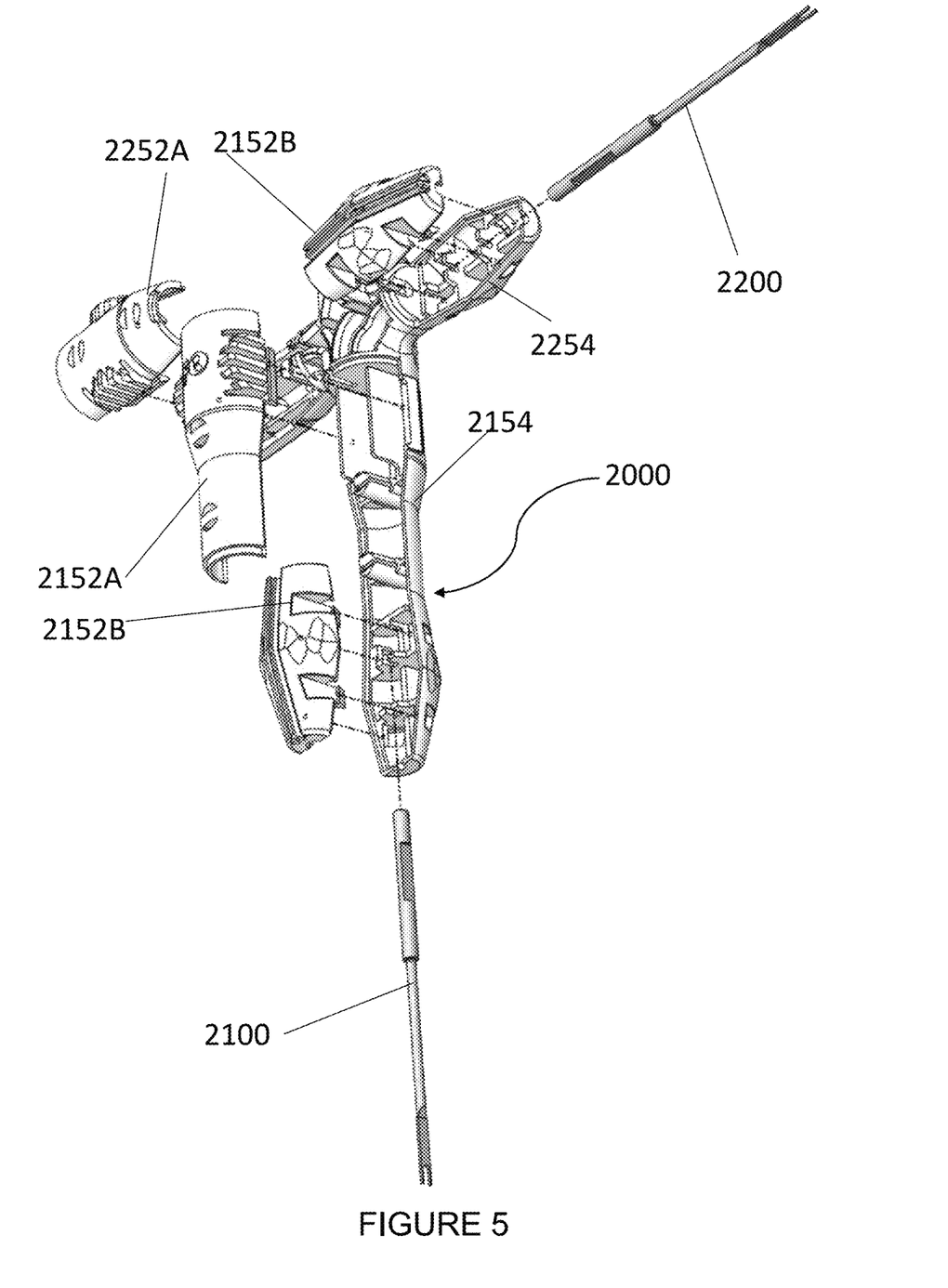
FIG. 5 is an exploded view of the inserter 2000.
Figure 6:
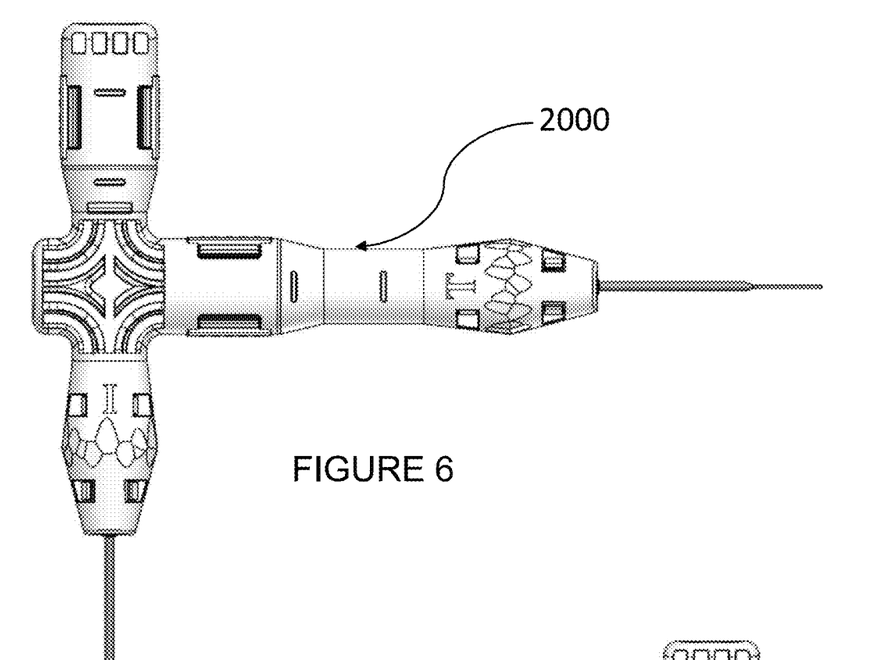
FIGS. 6 and 7 illustrate top and bottom views of the inserter 2000.
Figure 7:
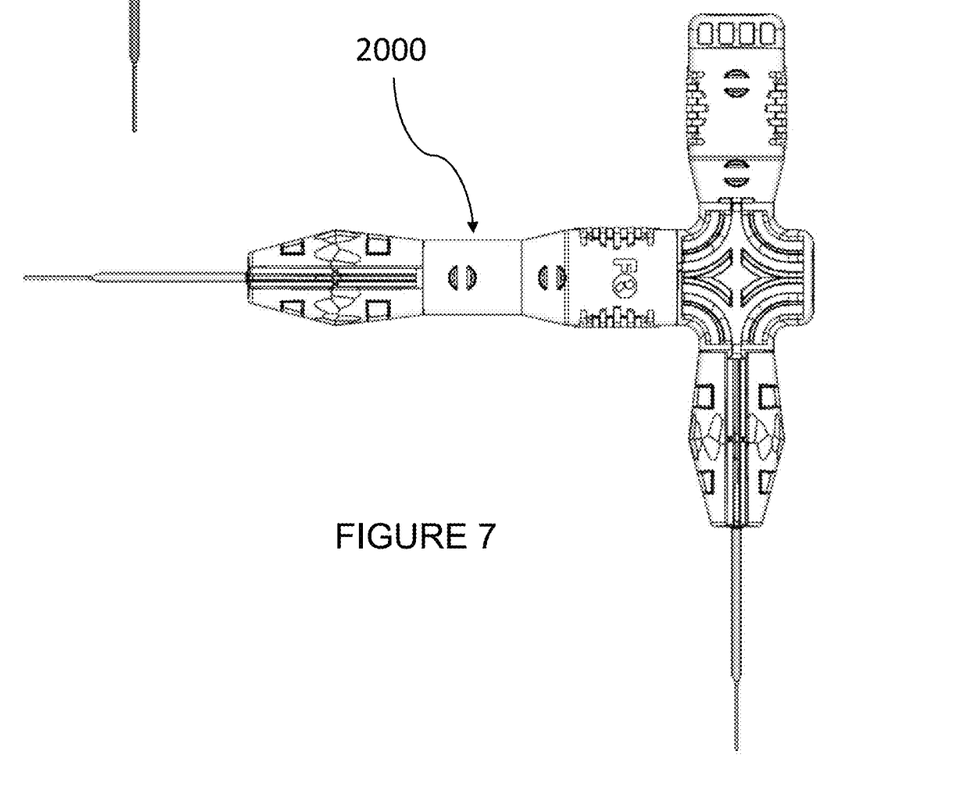

FIGS. 4 to 6 illustrate an inserter 2000 which is particularly (but not exclusively) well suited for deployment of the implant assembly 1000 described in the foregoing sections. Whilst the features of the inserter 200 have been described with reference to the implant assembly 1000, the scope of this inserter 2000 is not limited to the specific configuration of the implant assembly 1000 and other implant assemblies with multiple anchor bodies (such as anchor bodies 100A and 100B) may be used without departing from the spirit and scope of the inserter 2000. The inserter 2000 comprises a first and second elongate shafts 2100 and 2200 that are mutually perpendicular to each other. Each of the shafts 2100 and 2200 is identical in the preferred embodiment. Each shaft (2100 or 2200) comprises a pair of spaced apart tines positioned at a distal end of the shaft to define a bone tunnel engaging portion for being pushed into the metacarpal bones M1 or M2 to therein create the respective bone tunnels. The tines for each of the shafts (2100 and 2200) are spaced apart to define a slot therebetween that forms an anchor carrying portion that is immediately proximal to the bone tunnel forming portion.

Elongate shaft 2200 is used for insertion and loading of the first anchor body 100A. Specifically, the first anchor body 100A is positioned in the anchor carrying portion of the spaced apart tines located at the distal end of the first elongate shaft 2200 and segments of the primary and secondary sutures 200 and 300 extend from the proximal end of the first elongate shaft 2200 towards the anchor carrying portion before returning back from the distal end towards the proximal end of the elongate shaft 2200. The second anchor body 1006 is positioned in the anchor carrying portion of the spaced apart tines located at the distal end of the second elongate shaft 2100 and segments of the primary suture 200 extend from the proximal end of the second elongate shaft 2100 towards the anchor carrying portion before returning back from the distal end towards the proximal end of the second elongate shaft 2100. Each of the proximal portions of the shafts 2100 and 2200 is coupled with an inserter body with respective housing portions 2150 (2150A and 2150B) and 2250 (2250A and 2250B) that are also mutually perpendicular to each other. Each of the housing portions 2150 and 2250 is substantially hollow and provides channels for winding the primary and secondary sutures 200 and 300 therein. The inserter allows for each shaft 2100 and 2200 to be inserted through the bone tunnels B2 and B1 in order to position the anchor bodies 100A and 100B against the metacarpal bone surface of the index metacarpal M1 and the thumb metacarpal M2. Advantageously, the distal or leading end of each shaft 2100 and 2200 where the respective anchor bodies 100A and 100B are positioned comprises an overall thickness that is less than the thickness of the trailing portion of the shaft (2100 or 2200). As a result, when the anchor bodies 100A and 100B are loaded on the anchor receiving end portions of the shaft (2100 or 2200), the leading end of the shaft achieves a similar overall thickness when compared to the trailing portion of each shaft 2100 and 2200. Such a configuration further facilitates insertion of the anchor bodies 100A and 100B through the bone tunnels B1 and B2.

The first housing portion 2150 is provided with a first visual indicia such as the letter "I" to indicate that the first shaft 2100 should be inserted into the index metacarpal M1. The second housing position 2250 is also provided with a second visual indicia such as the letter "T" to indicate that the second shaft 2100 should be inserted into the thumb metacarpal bone M2.

As shown best in FIG. 5, the housing body 2150 may comprise cover portion 2152A to easily access the primary and secondary sutures 200 and 300 wound along winding channels provided on a holding portion 2154 of the housing body 2150. Similarly, the housing body 2250 may also comprise removable cover portions 2252A to easily access the primary suture 200 wound along winding channels provided on a holding portion 2254 of the housing body 2250.

In compliance with the statute, the invention has been described in language more or less specific to structural or methodical features. The term "comprises" and its variations, such as "comprising" and "comprised of" is used throughout in an inclusive sense and not to the exclusion of any additional features.

It is to be understood that the invention is not limited to specific features shown or described since the means herein described comprises preferred forms of putting the invention into effect.

The invention is, therefore, claimed in any of its forms or modifications within the proper scope of the appended claims appropriately interpreted by those skilled in the art.

The invention claimed is:

1. A surgical implant assembly comprising:
   first and second anchor bodies adapted to engage respective bone surfaces of first and second metacarpal bones;
   a primary suture having a suture length extending between first and second terminal segments of the primary suture, the suture length of the primary suture comprising a first suture segment that passes through the first anchor body and a second suture segment passing through the second anchor body with a bridging segment of the primary suture extending between the first and second suture segments of the primary suture wherein the first suture segment lies in between the bridging segment and the first terminal segment and wherein the second suture segment lies in between the bridging segment and the second terminal segment;
   a secondary suture having a suture length extending between first and second terminal segments of the secondary suture, the secondary suture comprising a secondary suture segment being passed through the first anchor body, the secondary suture segment being located between the first and second terminal segments of the secondary suture and wherein no portion of the secondary suture passes through the second anchor body;
   wherein the primary suture is received and passed towards the first anchor body for the first suture segment to be passed through the first anchor body before returning the primary suture thereby forming a first primary loop to engage the first anchor body and wherein the surgical implant assembly further comprises a primary suture sleeve for receiving and passing the primary suture towards the first anchor body for the first suture segment to be passed through the first anchor body before returning the primary suture through the primary suture sleeve thereby forming the first primary loop to engage the first anchor body;
   wherein the secondary suture is received and passed towards the first anchor body to pass the secondary suture segment through the first anchor body before returning the secondary suture thereby forming a secondary loop to engage the first anchor body; and
   wherein, during use, at least sections of the primary and secondary loops overlap along the bridging segment of the primary suture.

2. A surgical implant assembly in accordance with claim 1 wherein the first and second anchor bodies are deformable to be passed through respective bone tunnels drilled in the first and second metacarpal bones.

3. A surgical implant body in accordance with claim 1 wherein the first suture segment that passes through a plurality of apertures in the first anchor body and the second suture segment passing through a plurality of apertures in the second anchor body.

4. A surgical implant assembly in accordance with claim 1 wherein the primary suture sleeve is elongate and extends between first and second ends of the primary suture sleeve such that the primary suture is received into the first end of the primary suture sleeve before passed out from the second end of the primary suture sleeve to pass the primary suture segment through the first anchor body followed by returning the primary suture into the second end of the primary suture sleeve and passed out of the first end of the primary suture sleeve.

5. A surgical implant assembly in accordance with claim 1 wherein at least a part of the bridging segment passes through and extends out from the primary suture sleeve before extending towards the second anchor body.

6. A surgical implant assembly in accordance with claim 1 further comprising a secondary suture sleeve for receiving and passing the secondary suture towards the first anchor body to pass the secondary suture segment through the first anchor body before returning the secondary suture through the secondary suture sleeve thereby forming the secondary loop to engage the first anchor body.

7. A surgical implant assembly in accordance with claim 6 wherein the secondary suture sleeve is elongate and extends between first and second ends of the secondary suture sleeve such that the secondary suture is received into the first end of the secondary suture sleeve before being passed out from the second end of the secondary suture sleeve to pass the secondary suture segment through the first anchor body followed by returning the secondary suture into the second end secondary suture sleeve and out of the first end of the secondary suture sleeve such that both terminal segments of the secondary suture extend out from the second end of the secondary suture sleeve.

8. A surgical implant assembly in accordance with claim 7 wherein the primary sleeve is elongate and extends between first and second ends of the primary sleeve that the primary and secondary sleeves are joined at or adjacent their respective second ends.

9. A surgical implant assembly in accordance with claim 6 wherein the primary and secondary sleeves are joined at one or more joining locations.

10. A surgical implant assembly in accordance with claim 9 wherein each of the primary and secondary sleeves are formed from filamentary material to define a longitudinal lumen for each sleeve.

11. A surgical implant assembly in accordance with claim 1 wherein the first anchor body comprises an elongate and deformable structure with the primary and secondary sutures being pierced through the elongate and deformable structure along a plurality of piercing locations such that tensioning of the primary and/or secondary sutures increases radial dimensions of the first anchor to result in engagement of the first anchor with bone surfaces of the first metacarpal bone and prevent the anchor from passing through the bone tunnel in the first metacarpal bone.

12. A surgical implant assembly in accordance with claim 11 wherein the primary and secondary sutures are pierced through the first anchor body at said plurality of piercing locations that are spaced away from ends of the elongate and deformable structure of the first anchor body.

13. A surgical implant assembly in accordance with claim 1 wherein the second anchor body comprises an elongate and deformable structure with the primary suture being pierced through the elongate and deformable structure at a plurality of piercing locations such that tensioning of the primary suture increases radial dimensions of the second anchor to result in engagement of the second anchor with bone surfaces of the second metacarpal bone and prevent the second anchor from passing through the bone tunnel in the second metacarpal bone.

14. A surgical implant assembly in accordance with claim 13 wherein the primary suture is pierced through the second anchor body at said plurality of piercing locations that are spaced away from ends of the elongate and deformable structure of the second anchor body.

15. A surgical implant assembly in accordance with claim 1 wherein each of the first and second anchor bodies comprises a flat and fibrous construct.

16. A surgical implant assembly in accordance with claim 1 wherein the secondary suture comprises terminal ends, wherein each of the terminal ends of the secondary suture further comprises needles for piercing through tissue and allowing the terminal ends to be passed through tissue.

17. A method for performing basal joint arthroplasty, the method comprising:
providing an implantable assembly, the implantable assembly comprising:
first and second anchor bodies adapted to engage respective metacarpal bone surfaces of first and second metacarpal bones;
a primary suture having a suture length extending between first and second terminal segments of the primary suture, the suture length of the primary suture comprising a first suture segment that passes through the first anchor body and a second suture segment passing through the second anchor body with a bridging segment of the primary suture extending between the first and second suture segments of the primary suture wherein the first suture segment lies in between the bridging segment and the first terminal segment and wherein the second suture segment lies in between the bridging segment and the second terminal segment wherein the primary suture is received and passed towards the first anchor body for the first suture segment to be passed through the first anchor body before returning the primary suture thereby forming a first primary loop to engage the first anchor body;
a secondary suture having a suture length extending between first and second terminal segments of the secondary suture, the secondary suture comprising a secondary suture segment being passed through the first anchor body, the secondary suture segment being located between the first and second terminal segments of the secondary suture and wherein no portion of the secondary suture passes through the second anchor body; wherein the secondary suture is received and passed towards the first anchor body to pass the secondary suture segment through the first anchor body before returning the secondary suture thereby forming a secondary loop to engage the first anchor body; and
wherein, during use, at least sections of the primary and secondary loops overlap along the bridging segment of the primary suture
performing a trapeziectomy to create an arthroplasty space;
inserting the first anchor body through a first bore drilled across an index metacarpal bone followed by tensioning the primary suture whereby the first bore extends between two openings on the outer surface of the index metacarpal bone to effect engagement and anchoring of the first anchor body against the index metacarpal bone surface;
inserting the second anchor body through a second bore drilled across a thumb metacarpal bone followed by tensioning of the secondary suture whereby the second bore extends between two openings on the outer surface of the thumb metacarpal bone to effect engagement and anchoring of the second anchor body against the thumb metacarpal bone surface;
tensioning the primary and secondary sutures to position at least portions of the bridging segment, the primary loop of the primary suture and the secondary loop of the secondary suture segment of the secondary suture in the arthroplasty space along the articular base of the thumb metacarpal bone.

18. A method in accordance with claim 17 wherein the implant assembly further comprises:
a primary suture sleeve for receiving and passing the primary suture towards the first anchor body for the first suture segment to be passed through the first anchor body before returning the primary suture through the primary suture sleeve thereby forming the first primary loop to engage the first anchor body; and
a secondary suture sleeve for receiving and passing the secondary suture towards the first anchor body to pass the secondary suture segment through the first anchor body before returning the secondary suture through the secondary suture sleeve thereby forming the secondary loop to engage the first anchor body;

wherein tensioning the primary and secondary sutures results in the primary and secondary suture sleeves being positioned below the articular base of the thumb metacarpal bone to form a sling and support the articular base of the thumb metacarpal bone.

19. A surgical implant assembly comprising:

first and second anchor bodies adapted to engage respective bone surfaces of first and second bone regions;

a primary suture having a suture length extending between first and second terminal segments of the primary suture, the suture length of the primary suture comprising a first suture segment that passes through the first anchor body and a second suture segment passing through the second anchor body with a bridging segment of the primary suture extending between the first and second suture segments of the primary suture wherein the first suture segment lies in between the bridging segment and the first terminal segment and wherein the second suture segment lies in between the bridging segment and the second terminal segment;

a secondary suture having a suture length extending between first and second terminal segments of the secondary suture, the secondary suture comprising a secondary suture segment being passed through the first anchor body, the secondary suture segment being located between the first and second terminal segments of the secondary suture and wherein no portion of the secondary suture passes through the second anchor body;

wherein the primary suture is received and passed towards the first anchor body for the first suture segment to be passed through the first anchor body before returning the primary suture thereby forming a first primary loop to engage the first anchor body and wherein the surgical implant assembly further comprises a primary suture sleeve for receiving and passing the primary suture towards the first anchor body for the first suture segment to be passed through the first anchor body before returning the primary suture through the primary suture sleeve thereby forming the first primary loop to engage the first anchor body;

wherein the secondary suture is received and passed towards the first anchor body to pass the secondary suture segment through the first anchor body before returning the secondary suture thereby forming a secondary loop to engage the first anchor body; and wherein, during use, at least sections of the primary and secondary loops overlap along the bridging segment of the primary suture.

\* \* \* \* \*